(12) United States Patent
Shontz et al.

(10) Patent No.: US 10,839,458 B2
(45) Date of Patent: *Nov. 17, 2020

(54) ELECTRONIC MARKET MESSAGE MANAGEMENT USING PRIORITY DETERMINATION

(71) Applicant: Chicago Mercantile Exchange Inc., Chicago, IL (US)

(72) Inventors: Alan Shontz, Chicago, IL (US); John Labuszewski, Chicago, IL (US); Richard Co, Chicago, IL (US); Steve Peters, Chicago, IL (US); David Boberski, Chicago, IL (US); Roberta Paffaro, Sao Paulo (BR); Greg Skony, Chicago, IL (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 185 days.

This patent is subject to a terminal disclaimer.

(21) Appl. No.: 16/056,992

(22) Filed: Aug. 7, 2018

(65) Prior Publication Data

US 2018/0342013 A1 Nov. 29, 2018

Related U.S. Application Data

(63) Continuation of application No. 14/502,341, filed on Sep. 30, 2014, now Pat. No. 10,068,291.

(51) Int. Cl.
*G06Q 40/04* (2012.01)
(52) U.S. Cl.
CPC .................................. *G06Q 40/04* (2013.01)

(58) Field of Classification Search
None
See application file for complete search history.

(56) References Cited

U.S. PATENT DOCUMENTS

| 5,101,353 | A | * | 3/1992 | Lupien | ............... | G06Q 40/04 |
| | | | | | | 340/4.5 |
| 5,689,652 | A | * | 11/1997 | Lupien | ............... | G06Q 40/00 |
| | | | | | | 705/37 |
| 5,845,266 | A | * | 12/1998 | Lupien | ............... | G06Q 40/00 |
| | | | | | | 705/36 R |
| 6,311,178 | B1 | * | 10/2001 | Bi | ............... | G06Q 30/06 |
| | | | | | | 707/706 |
| 8,645,259 | B1 | * | 2/2014 | Draganov | ............ | G06Q 40/04 |
| | | | | | | 705/37 |
| 2002/0010672 | A1 | * | 1/2002 | Waelbroeck | ........ | G06Q 40/04 |
| | | | | | | 705/37 |

(Continued)

OTHER PUBLICATIONS

Eric Budish et al., "The High-Frequency Trading Arms Race: Frequent Batch Auctions as a Market Design Response", Dec. 23, 2013, 70 pages, Fama-Miller Working Paper; Chicago Booth Research Paper No. 14-03.

*Primary Examiner* — Christopher Bridges
(74) *Attorney, Agent, or Firm* — Lempia Summerfield Katz LLC

(57) ABSTRACT

Methods, devices, and systems for managing electronic messages of an electronic trading system in which orders are extracted from the electronic messages involve executing actions associated with respect to the orders and matching orders to counter orders. Matching orders may be based on a priority determined using a market quality index of the order and an associated market participant.

20 Claims, 7 Drawing Sheets

(56) References Cited

U.S. PATENT DOCUMENTS

| | | | |
|---|---|---|---|
| 2004/0088242 A1* | 5/2004 | Ascher | G06Q 40/04 705/37 |
| 2006/0155635 A1* | 7/2006 | Borro | G06Q 40/04 705/37 |
| 2007/0055607 A1* | 3/2007 | Wunsch | G06Q 40/04 705/37 |
| 2010/0017323 A1* | 1/2010 | Zimmerman | G06Q 40/06 705/37 |
| 2010/0106636 A1* | 4/2010 | Lutnick | G06Q 10/00 705/37 |
| 2011/0093380 A1* | 4/2011 | Fitzpatrick | G06Q 40/00 705/37 |
| 2012/0209758 A1* | 8/2012 | Adcock | G06Q 40/06 705/37 |
| 2012/0221462 A1* | 8/2012 | De Verdier | G06Q 40/06 705/37 |
| 2012/0246052 A1* | 9/2012 | Taylor | G06Q 40/06 705/37 |
| 2014/0006243 A1* | 1/2014 | Boudreault | G06Q 40/04 705/37 |

* cited by examiner

ELECTRONIC MARKET MESSAGE MANAGEMENT USING PRIORITY DETERMINATION

CROSS REFERENCE TO RELATED APPLICATIONS

This application is a continuation under 37 C.F.R. § 1.53(b) of U.S. patent application Ser. No. 14/502,341 filed Sep. 30, 2014 now U.S. Pat. No. 10,068,291, the entire disclosure of which is incorporated by reference in its entirety.

BACKGROUND

A financial instrument trading system, such as a futures exchange, referred to herein also as an "Exchange", such as the Chicago Mercantile Exchange Inc. (CME), provides a contract market where financial instruments, for example futures and options on futures, are traded using electronic systems. Futures is a term used to designate all contracts for the purchase or sale of financial instruments or physical commodities for future delivery or cash settlement on a commodity futures exchange. A futures contract is a legally binding agreement to buy or sell a commodity at a specified price at a predetermined future time. An option is the right, but not the obligation, to sell or buy the underlying instrument (in this case, a futures contract) at a specified price within a specified time. The commodity to be delivered in fulfillment of the contract, or alternatively the commodity for which the cash market price shall determine the final settlement price of the futures contract, is known as the contract's underlying reference or "underlier." The terms and conditions of each futures contract are standardized as to the specification of the contract's underlying reference commodity, the quality of such commodity, quantity, delivery date, and means of contract settlement. Cash Settlement is a method of settling a futures contract whereby the parties effect final settlement when the contract expires by paying/receiving the loss/gain related to the contract in cash, rather than by effecting physical sale and purchase of the underlying reference commodity at a price determined by the futures contract, price.

Typically, the Exchange provides for a centralized "clearing house" through which all trades made must be confirmed, matched, and settled each day until offset or delivered. The clearing house is an adjunct to the Exchange, and may be an operating division of the Exchange, which is responsible for settling trading accounts, clearing trades, collecting and maintaining performance bond funds, regulating delivery, and reporting trading data. The essential role of the clearing house is to mitigate credit risk. Clearing is the procedure through which the Clearing House becomes buyer to each seller of a futures contract, and seller to each buyer, also referred to as a novation, and assumes responsibility for protecting buyers and sellers from financial loss due to breach of contract, by assuring performance on each contract. A clearing member is a firm qualified to clear trades through the Clearing House.

Current financial instrument trading systems allow traders to submit orders and receive confirmations, market data, and other information electronically via electronic messages exchanged using a network. These "electronic" marketplaces have largely supplanted the pit based trading systems whereby the traders, or their representatives, all physically stand in a designated location, i.e. a trading pit, and trade with each other via oral and hand based communication. Anyone standing in or near the trading pit may be privy to the trades taking place, i.e. both who is trading and what they are trading, allowing, for example, one participant to derive and/or undermine another participant's trading strategy and thereby garner an unfair advantage or otherwise skew the market. Electronic trading systems, in contrast, ideally attempt offer a more efficient, fair and balanced market where market prices reflect a true consensus of the value of traded products among the market participants, where the intentional or unintentional influence of any one market participant is minimized if not eliminated, and where unfair or inequitable advantages with respect to information access are minimized if not eliminated.

Electronic marketplaces attempt to achieve these goals by using electronic messages to communicate actions and related data of the electronic marketplace between market participants, clearing firms, clearing houses, and other parties. The messages can be received using an electronic trading system, wherein an action associated with the messages may be executed. For example, the message may contain information relating to an order to buy or sell a product in a particular electronic marketplace, and the action associated with the message may indicate that the order is to be placed in the electronic marketplace such that other orders which were previously placed may potentially be matched to the order of the received message. In this way the electronic marketplace may conduct market activities through electronic systems with minimized face-to-face interaction as was previously required in pit based trading systems.

Electronic trading systems, however, may provide limited control by market participants of the execution of actions in a market. Specifically, once a message has been sent by a market participant, the market participant may be limited by the timing and deterministic processing of messages by the electronic trading system for executing actions associated with the electronic messages. Any control over the execution of actions associated with electronic messages previously sent may require the submission of additional electronic messages, or may not be possible at all. Market participants may desire an increased control of market activity than is generally available with such traditional electronic trading systems. This increased control may allow a market participant an ability to have more control over how, where, when, and/or under what circumstances actions are executed in an electronic trading system.

Electronic trading systems may also require the use of additional order matching techniques to execute orders submitted through the system, as face-to-face communication and acceptance of trades may not be provided as readily in an electronic trading system wherein human discretion may be at least partially replaced by programmed and configured logic to execute trades of orders according to established rules and principles of the market.

DETAILED DESCRIPTION

Figure 1:
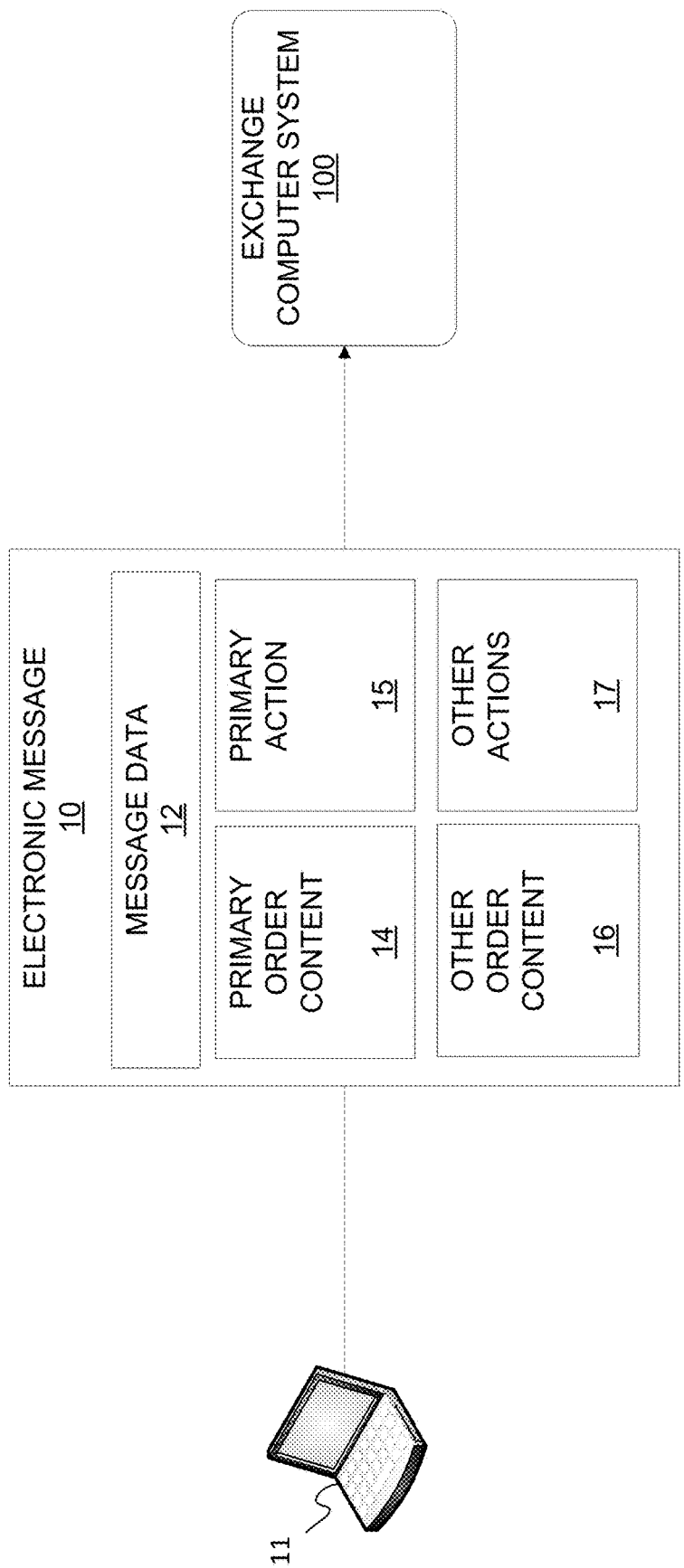
FIG. 1 depicts an electronic message as communicated in an illustrative computer network system that may be used to implement electronic market message management.

The disclosed embodiments relate generally to the communication, management, and manipulation of electronic messages and the data contained therein. Specifically, the disclosed embodiments provide for particular configurations, and methods of operation, of systems for receiving and manipulating electronic messages as well as performing actions associated with the data contained therein. As such, market participants may be provided additional control over the execution of actions in an electronic trading system through the inclusion of additional data and/or information in electronic messages that can indicate to a specifically configured electronic trading system how, where, when, and/or under what circumstances actions are to be executed in an electronic trading system. The additional data may indicate additional actions, such as conditional actions and/or the timing of the execution of actions that are to be associated with the messages.

While the disclosed embodiments may be discussed in relation to futures and/or options on futures trading, it will be appreciated that the disclosed embodiments may be applicable to any equity, fixed income security, currency, commodity, options or futures trading system or market now available or later developed. It will be appreciated that a trading environment, such as a futures exchange as described herein, implements one or more economic markets where rights and obligations may be traded. As such, a trading environment may be characterized by a need to maintain market integrity, transparency, predictability, fair/equitable access and participant expectations with respect thereto. For example, an exchange must respond to inputs, such as trader orders, cancellation, etc., in a manner as expected by the market participants, such as based on market data, e.g. prices, available counter-orders, etc., to provide an expected level of certainty that transactions will occur in a consistent and predictable manner and without unknown or unascertainable risks. In addition, it will be appreciated that electronic trading systems further impose additional expectations and demands by market participants as to transaction processing speed, latency, capacity and response time, while creating additional complexities relating thereto. Accordingly, as will be described, the disclosed embodiments may further include functionality to ensure that the expectations of market participant are met, e.g. that transactional integrity and predictable system responses are maintained.

As was discussed above, electronic trading systems ideally attempt to offer an efficient, fair and balanced market where market prices reflect a true consensus of the value of products traded among the market participants, where the intentional or unintentional influence of any one market participant is minimized if not eliminated, and where unfair or inequitable advantages with respect to information access are minimized if not eliminated.

The disclosed embodiments recognize that electronic messages such as incoming messages from market participants, e.g. trade order messages, etc., are sent from market participants, or their representatives, to an electronic trading or market system. For example, a market participant may submit an electronic message to the electronic trading system that includes an associated specific action to be undertaken by the electronic trading system, such as such as entering a new trade order into the market or modifying an existing order in the market.

As used herein, a financial message, or an electronic message, refers both to messages communicated by market participants to an electronic trading or market system and vice versa. The messages may be communicated using packeting or other techniques operable to communicate information between systems and system components. Some messages may have associated actions to be taken in the electronic trading or market system. Financial messages communicated to the electronic trading system, also referred to as "inbound" messages, may include associated actions that characterize the messages, such as trader orders, order modifications, order cancellations and the like, as well as other message types. Financial messages communicated from the electronic trading system, referred to as "outbound" messages, may include messages responsive to inbound messages, such as confirmation messages, or other messages such as market update messages, quote messages, and the like.

An electronic trading system may operate using any trade matching or processing technique. For example, continuous auction processing or batch auction processing may be used. Continuous auction processing is a common trade processing technique and involves the placing and matching of orders continuously as a market is open for accepting orders. Batch auction processing, however, varies from continuous auction processing in that orders are placed and collected over a period of time, and collected orders are matched at the conclusion of the period of time. For example, with reference to FIG. 5, a market order book 710 may collect orders from a starting time 712 to at ending time 714 of the collection period. A time period may be any period of time. For example, one second, one minute, or one hour may be a time period. Further, orders may be provided, and subsequently entered into the market, on a blind basis during the collection period, such that market participants providing orders may not have the benefit of referencing previously and/or concurrently provided orders of the collection period as a guide in developing an offer for the market. At or after the ending time 714 has elapsed collected placed orders are matched. Placed orders without an acceptable counter order thereto may remain unmatched. Consequently, the unmatched orders may be deleted from the market, or transitioned to a subsequent order collection period, depending on an implementation. Batch auction processing may involve many different time periods of order collection, and during this time information may be made available to the market that may affect a perception of the value of products currently being traded in the market. As such, a control of timing and/or execution of actions within the period of order collection may be provided. For example, a market participant may find that it is advantageous to have an order placed at a particular time within the order collection time period.

Particular times within the order collection period may also become widely recognized as having value, resulting in increased order placement activity with respect thereto, and as such may burden the physical processing capabilities of an electronic trading system. Because of this, an electronic trading system may ration or otherwise limit the number of orders which may specify any given particular time within the order collection period. Thus limiting the resources required by the electronic trading system to process orders at the given particular times. In an embodiment, a temporal window order may be an order type that is placed at a pre-specified time relative to the beginning or conclusion of an order collection period in a batch auction. Further, the order period may be broken down into sub-periods, or windows which may be specified for an order's entry into an electronic trading system or other order actions. For example, a one minute long order entry collection period may be broken into 100 ten millisecond windows, which may or may not be distinct and/or consecutive windows of time. Also, a precise temporal window may be specified at which an order is to be entered into a system for purposes of establishing a first-in-first-out priority, or lack thereof, within the collected orders. As such, an order may be placed for trading in an electronic market, operating in the electronic trading system, at a specified time, as technological considerations may dictate, prior to the specific temporal parameter at which it is entered.

As indicated above, technological limitations of a system may be provided so that an order is processed and actually entered in the electronic trading system to establish a temporal priority at the specified time. Once entered, a temporally specific order may be time stamped with the specified temporal entry parameter which may provide the market participant with flexibility of entering orders at specific times or during specific windows. As such, this process may reduce congestion during peak order entry times within an order collection period of an electronic trading system by bringing the order into the electronic trading system prior to a time at which it is to be entered. Thus limiting or otherwise reducing the resources required by the electronic trading system to process orders during peak order entry times.

Further, an overuse of temporally specific orders may create congestion within the electronic trading system, and thus a specific allocation of temporally specific orders may be provided to limit the use of such techniques. A system for allocating such orders may smooth out uneven demand for temporally specific orders during particularly desirable times during an order collection period. Thus limiting or otherwise reducing the resources required by the electronic trading system to process orders during peak order entry times. For example an allocation of temporally specific orders may be made amongst market participants such that each market participant is allowed to provide a maximum number of temporally specific orders during each collection period, sub-period, or calibrated time stamped node of the period. Allocations may also be made using various criteria and/or techniques. Some techniques may include a reference to trading activity or volume recorded by a market participant over a specified historical time period, selling temporally specific orders at a fixed price or through an auction process, allocation on a preferential basis to specified types of market participants which are considered desirable in a marketplace such as market participants considered market makers or market participants from particular regions, or a hybrid allocation technique developed as a combination of various allocation techniques, including those disclosed herein.

Also, a market participant may find that it is advantageous to have an order placed during the collection period, but conditional such that the order may be modified upon the occurrence of an event prior to the end of the collection period. For example, a message may be received by the electronic trading system that has an associated action involving the placement of the order in the market during the order collection period. Subsequent to the placement of the order, an event may occur, and data relating to the event may be received by the electronic trading system. In such a situation, the message may include another associated action which involves a modification of the original order prior to the conclusion of the order collection period as a response to the received data. As such, auto-canceling or auto-modifying orders may be used in a batch auction to dissipate risk associated with the passage of time during the accumulating of orders to be matched. By triggering such actions on detectable events, a market participant may be protected from placing an order and having values changed during the order accumulation period based on the occurrence of an event. Such triggering events may be the release of an economic statistic during the order collection period, pricing information disseminated from other adjacent and/or correlated markets during the order collection period, a change in market sentiment as detected by the use of keywords in social media or in public statements of officials which may influence economic policies, including monetary and fiscal policies. Further, the cancellation or modification action may be specified to be executed at a pre-specified time, such as five milliseconds from the end of the collection period. As such, the execution of the modification or cancellation action may be triggered by an occurrence of an event and executed at a specified time. By specifying a time close to the close of the collection period, a market participant may be able to benefit from as much available information as may be made available during the course of the order collection period. Also, such configurations may preclude a subsequent flood of messages, such as from algorithmic order submission systems, to an electronic trading system due to event occurrences, as conditional actions associated with the orders may already be loaded into the system at the occurrence of the event, thus already taking into account the possibilities of the occurrence of the specified events. In this way, excessive loading on electronic trading system computational resources may be avoided so as to allow the system to perform more efficiently and effectively.

Further, electronic trading systems may perform actions on orders placed from received messages based on various characteristics of the messages and/or market participants associated with the messages. These actions may include matching the orders either during a continuous auction process, or at the conclusion of a collection period during a batch auction process. The matching of order may be by any technique.

The matching of orders may occur based on a priority indicated by the characteristics of orders and market participants associated with the orders. Orders having a higher priority may be matched before orders of a low priority. This priority may be determined using various techniques. For example, orders that were indicated by messages received earlier may receive a higher priority to match than orders that were indicated by messages received later. Also, scoring or grading of the characteristics may provide for priority determination.

Generally, a market may involve market makers, such as market participants who consistently provide bids and/or offers at specific prices in a manner typically conducive to balancing risk, and market takers who may be willing to execute transactions at prevailing bids or offers may be characterized by more aggressive actions so as to maintain risk and/or exposure as a speculative investment strategy.

From an alternate perspective, a market maker may be considered a market participant who places an order to sell at a price at which there is no previously or concurrently provided counter order. Similarly, a market taker may be considered a market participant who places an order to buy at a price at which there is a previously or concurrently provided counter order. A balanced and efficient market may involve both market makers and market takers, coexisting in a mutually beneficial basis. The mutual existence, when functioning properly, may facilitate liquidity in the market such that a market may exist with "tight" bid-ask spreads and a "deep" volume from many currently provided orders such that large quantity orders may be executed without driving prices significantly higher or lower. As such, both market participant types are useful in generating liquidity in a market, but specific characteristics of market activity taken by market participants may provide an indication of a particular market participant's effect on market liquidity. For example, a Market Quality Index ("MQI") of an order may be determined using the characteristics. An MQI may be considered a value indicating a likelihood that a particular order will improve or facilitate liquidity in a market. That is, the value may indicate a likelihood that the order will increase a probability that subsequent requests and transaction from other market participants will be satisfied. As such, an MQI may be determined based on a proximity of the entered price of an order to a midpoint of a current bid-ask price spread, a size of the entered order, a volume or quantity of previously filled orders of the market participant associated with the order, and/or a frequency of modifications to previous orders of the market participant associated with the order. In this way, an electronic trading system may function to assess and/or assign an MQI to received electronic messages to establish messages that have a higher value to the system, and thus the system may use computing resources more efficiently by expending resources to match orders of the higher value messages prior to expending resources of lower value messages.

While an MQI may be applied to any or all market participants, such an index may also be applied only to a subset thereof, such as large market participants, or market participants whose market activity as measured in terms of average daily message traffic over a limited historical time period exceeds a specified number. For example, a market participant generating more than 500, 1,000, or even 10,000 market messages per day may be considered a large market participant.

In accordance with aspects of the disclosure, systems and methods are disclosed for managing financial messages in an electronic market. The disclosed embodiments are preferably implemented with computer devices and computer networks, such as those described with respect FIG. 4, that allow users, e.g. market participants, to exchange trading information. It will be appreciated that the plurality of entities utilizing the disclosed embodiments, e.g. the market participants, may be referred to by other nomenclature reflecting the role that the particular entity is performing with respect to the disclosed embodiments and that a given entity may perform more than one role depending upon the implementation and the nature of the particular transaction being undertaken, as well as the entity's contractual and/or legal relationship with another market participant and/or the exchange.

FIG. 1 depicts the communication of an electronic message 10 between a system user or market participant 11 and an exchange computer system 100, also referred to as an electronic trading system 100, as used to facilitate electronic trading. The electronic message 10 may be communicated with the exchange computer system using any protocol or technique, as will be discussed further below. For example, the electronic message may be communicated using an open message standard implementation, such as Financial Information eXchange ("FIX") or FIX/FAST protocols. The electronic message may contain specific types of data that can be used by the exchange computer system 100 to facilitate electronic trading. For example, the electronic message may contain general message data 12 such as a time stamp of receipt, and other data such as header data relating to the specific communication of the message 10. The electronic message 10 may also contain information relating to a specific order, or orders, which the market participant desires to be transacted using the exchange computer system. Primary order content 14 may involve any information from which a specific order for a financial product may be extracted or derived. For example, the electronic message may include primary order content 14 such as an indicated specific financial product, a requested price to buy or sell the financial product, a volume of financial products to buy or sell at the requested price, as well as further characteristics of the order such as information indicating the market participant associated with the order. The electronic message may also include a primary action 15 as associated with the order. A primary action 15 may be any action to be undertaken by the exchange computer system 100 with respect to the order. For example, the primary action 15 may involve placing the order into an electronic trading system such that the order may be matched and ultimately traded. The primary action 15 may be explicit or implied. For example, the electronic message may contain data explicitly indicating a particular action. Alternatively, the electronic message 10 may have an implied action based on the primary order content 14 and/or operation of the exchange computer system 100. For example, the exchange computer system 100 may be configured to place an order extracted from the primary order content 14 without the electronic message 10 containing explicit data indicating a placement action for the order. Also, the primary action 15 may also involve modifying, canceling, or other actions to take with respect to an order previously placed in a financial market.

An electronic message may also include other order content 16 as well as other actions 17 that may be associated with the order derived from the primary order content 14. For example, the other order content 16 may involve a specific time at which the primary action is to be undertaken by the exchange computer system. In an embodiment involving an electronic trading system operating using batch auction principles, the electronic message 10 involves other order content 16 which contains data representative of a particular time between a beginning and an end of an order collection period at which the primary action 15, such as placing an order into a market, associated with the at least one electronic message is to be executed.

Other actions 17 may also be included in an electronic message 10. In an embodiment, an electronic message 10 may also include an action to modify the order extracted from the primary order content 14 and placed in an electronic trading system according to the primary action 15. The modification action may be conditional, in that the modification action should be undertaken upon the detection of an event, which may be described in the information of the other order content 16. In an embodiment involving an electronic trading system involving batch auction principles, an exchange computer system 100 may detect, subsequent to the execution of the primary action 15, when the electronic message 10 involves other order content including data representative of an event and the second action, whether the event has occurred after the executing of the primary action 15 of the electronic message 10 and prior to the end of an order collection period in which the primary action 15 was executed. The exchange computer system 100 may further execute in response to detection of the occurrence of the event, prior to the end of the order collection period, the other action 17 associated with the electronic message 10. The other action 17 may involve modifying the placed order according to characteristics contained in the other order content 16, or even canceling the order.

Figure 2A:
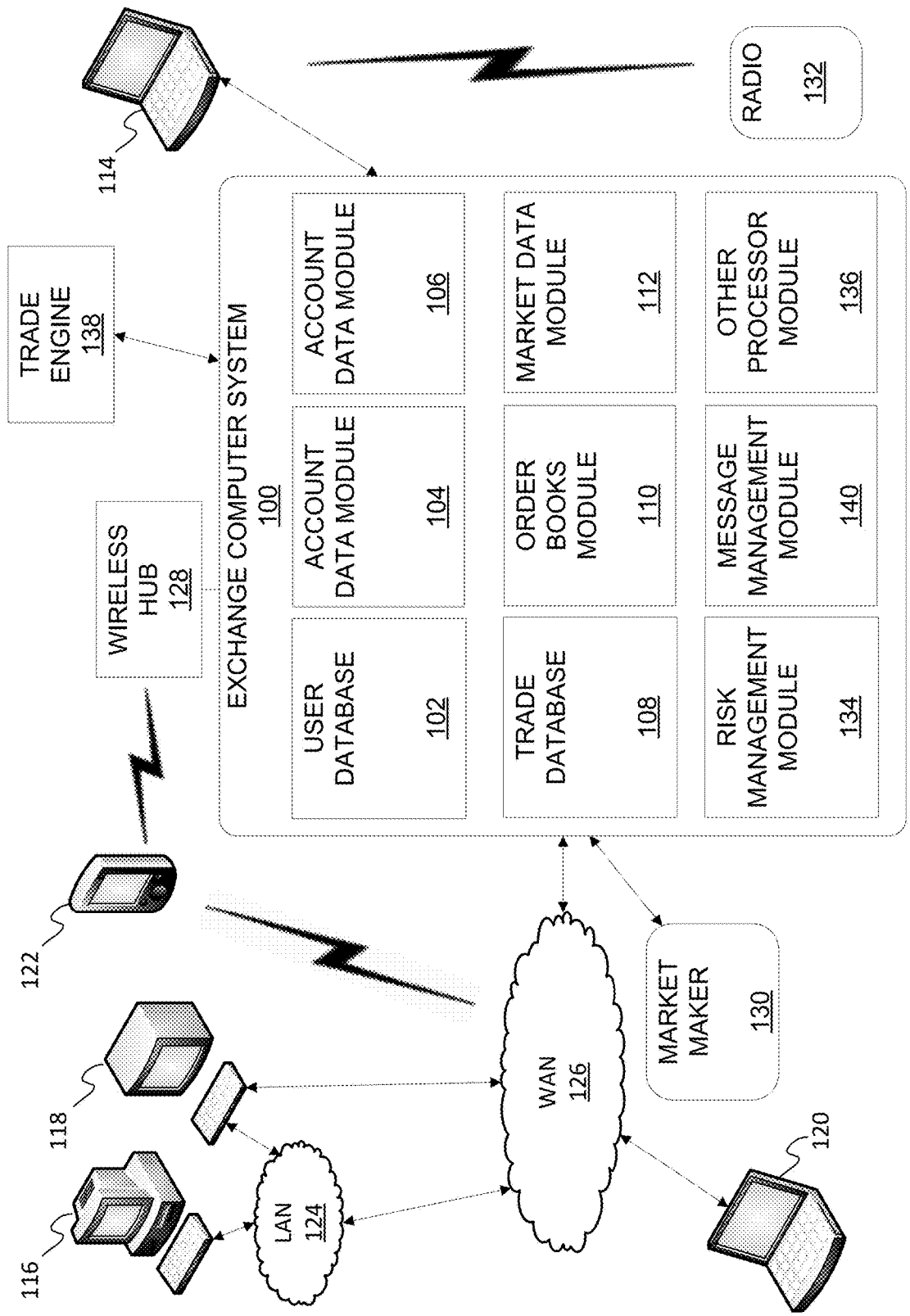
FIG. 2A depicts an illustrative computer network system that may be used to implement aspects of the disclosed embodiments.

An exemplary trading network environment for implementing trading systems and methods is shown in FIG. 2A. An exchange computer system 100 receives messages that include orders and transmits market data related to orders and trades to users, such as via wide area network 126 and/or local area network 124 and computer devices 114, 116, 118, 120 and 122, as will be described below, coupled with the exchange computer system 100.

Herein, the phrase "coupled with" is defined to mean directly connected to or indirectly connected through one or more intermediate components. Such intermediate components may include both hardware and software based components. Further, to clarify the use in the pending claims and to hereby provide notice to the public, the phrases "at least one of <A>, <B>, . . . and <N>" or "at least one of <A>, <B>, <N>, or combinations thereof" are defined by the Applicant in the broadest sense, superseding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

The exchange computer system 100 may be implemented with one or more mainframe, desktop or other computers, such as the computer 400 described below with respect to FIG. 4. A user database 102 may be provided which includes information identifying traders and other users of exchange computer system 100, such as account numbers or identifiers, user names and passwords. An account data module 104 may be provided which may process account information that may be used during trades. A match engine module 106 may be included to match bid and offer prices and may be implemented with software that executes one or more algorithms for matching bids and offers. A trade database 108 may be included to store information identifying trades and descriptions of trades. In particular, a trade database may store information identifying the time that a trade took place and the contract price. An order book module 110 may be included to compute or otherwise determine current bid and offer prices, for example in a continuous auction market, or also operate as an order accumulation buffer for a batch auction market. A market data module 112 may be included to collect market data and prepare the data for transmission to users. A risk management module 134 may be included to compute and determine a user's risk utilization in relation to the user's defined risk thresholds. An order processing module 136 may be included to decompose delta based and bulk order types for processing by the order book module 110 and/or match engine module 106. A message management module 140 may be included to, among other things, receive, and extract orders from, electronic messages as is indicated with one or more aspects of the disclosed embodiments. It will be appreciated that concurrent processing limits may be defined by or imposed separately or in combination, as was described above, on one or more of the trading system components, including the user database 102, the account data module 104, the match engine module 106, the trade database 108, the order book module 110, the market data module 112, the risk management module 134, the order processing module 136, or other component of the exchange computer system 100.

In an embodiment, the message management module 140, as coupled with the order books module 110, may be configured for receiving a plurality of electronic messages, each of the plurality of messages having an associated action to be executed within a designated period of time having a beginning time and an ending time, wherein at least one electronic message of the plurality of electronic messages comprises data representative of a particular time between the beginning and end of the period of time at which the action associated with the at least one electronic message is to be executed. The exchange computer system 100 may then be further configured to execute the action associated with the at least one temporally specific message at the particular time.

In another embodiment, the message management module 140, as coupled with the order books module 110, may be configured for receiving a plurality of electronic messages, each of the plurality of messages having an associated action to be executed within a designated period of time having a beginning time and an ending time, wherein a subset of the plurality of electronic messages each comprise a particular time between the beginning and end of the period of time at which the action associated with the at least one electronic message is to be executed. The exchange computer system 100 may be further configured to execute the action associated with a portion of the subset, wherein the portion is limited to a specified maximum number of temporally specific messages during the period of time. The message management module 140 may define a point of ingress into the exchange computer system 100 where messages are ordered and considered to be received by the system. This may be considered a point of determinism in the exchange computer system 100 that defines the earliest point where the system can ascribe an order of receipt to arriving messages. The point of determinism may or may not be at or near the demarcation point between the exchange computer system 100 and a public/internet network infrastructure.

In another embodiment, the message management module 140, as coupled with the order books module 110, may be configured for receiving a plurality of electronic messages, each of the plurality of messages comprising data representative of a period of time and an associated first action to be executed therein, wherein at least one electronic message of the plurality of electronic messages further comprises data representative of an event and a second action to be executed upon the occurrence of the event prior to the end of the period of time. In an embodiment, the first action may include placing the associated order into an electronic market, and a second action may include modifying the associated order. The message management module 140, as coupled with the order books module 110, may also be configured for executing the first action of each of the plurality of electronic messages during the designated period of time. The message management module 140, as coupled with the order books module 110, may also be configured for detecting, subsequent to the execution of the first action when the electronic message further comprises the data representative of the event and the second action, whether the event has occurred after the executing of the first action of the electronic message and prior to the end of the of the period of time. The message management module 140, as coupled with the order books module 110, may also be configured for executing, in response to detection of the occurrence of the event, prior to the end of the period of time, the second action associated with the modification message.

The trading network environment shown in FIG. 2A includes exemplary computer devices 114, 116, 118, 120 and 122 which depict different exemplary methods or media by which a computer device may be coupled with the exchange computer system 100 or by which a user may communicate, e.g. send and receive, trade or other information therewith. It will be appreciated that the types of computer devices deployed by traders and the methods and media by which they communicate with the exchange computer system 100 is implementation dependent and may vary and that not all of the depicted computer devices and/or means/media of communication may be used and that other computer devices and/or means/media of communications, now available or later developed may be used. Each computer device, which may comprise a computer 400 described in more detail below with respect to FIG. 4, may include a central processor that controls the overall operation of the computer and a system bus that connects the central processor to one or more conventional components, such as a network card or modem. Each computer device may also include a variety of interface units and drives for reading and writing data or files and communicating with other computer devices and with the exchange computer system 100. Depending on the type of computer device, a user can interact with the computer with a keyboard, pointing device, microphone, pen device or other input device now available or later developed.

An exemplary computer device 114 is shown directly connected to exchange computer system 100, such as via a T1 line, a common local area network (LAN) or other wired and/or wireless medium for connecting computer devices, such as the network 420 shown in FIG. 4 and described below with respect thereto. The exemplary computer device 114 is further shown connected to a radio 132. The user of radio 132, which may include a cellular telephone, smart phone, or other wireless proprietary and/or non-proprietary device, may be a trader or exchange employee. The radio user may transmit orders or other information to the exemplary computer device 114 or a user thereof. The user of the exemplary computer device 114, or the exemplary computer device 114 alone and/or autonomously, may then transmit the trade or other information to the exchange computer system 100.

Exemplary computer devices 116 and 118 are coupled with a local area network ("LAN") 124 which may be configured in one or more of the well-known LAN topologies, e.g. star, daisy chain, etc., and may use a variety of different protocols, such as Ethernet, TCP/IP, etc. The exemplary computer devices 116 and 118 may communicate with each other and with other computer and other devices which are coupled with the LAN 124. Computer and other devices may be coupled with the LAN 124 via twisted pair wires, coaxial cable, fiber optics or other wired or wireless media. As shown in FIG. 1, an exemplary wireless personal digital assistant device ("PDA") 122, such as a mobile telephone, tablet based compute device, or other wireless device, may communicate with the LAN 124 and/or the Internet 126 via radio waves, such as via WiFi, Bluetooth and/or a cellular telephone based data communications protocol. PDA 122 may also communicate with exchange computer system 100 via a conventional wireless hub 128.

FIG. 2A also shows the LAN 124 coupled with a wide area network ("WAN") 126 which may be comprised of one or more public or private wired or wireless networks. In one embodiment, the WAN 126 includes the Internet 126. The LAN 124 may include a router to connect LAN 124 to the Internet 126. Exemplary computer device 120 is shown coupled directly to the Internet 126, such as via a modem, DSL line, satellite dish or any other device for connecting a computer device to the Internet 126 via a service provider therefore as is known. LAN 124 and/or WAN 126 may be the same as the network 420 shown in FIG. 4 and described below with respect thereto.

As was described above, the users of the exchange computer system 100 may include one or more market makers 130 which may maintain a market by providing constant bid and offer prices for a derivative or security to the exchange computer system 100, such as via one of the exemplary computer devices depicted. The exchange computer system 100 may also exchange information with other trade engines, such as trade engine 138. One skilled in the art will appreciate that numerous additional computers and systems may be coupled to exchange computer system 100. Such computers and systems may include clearing, regulatory and fee systems.

The operations of computer devices and systems shown in FIG. 2A may be controlled by computer-executable instructions stored on a non-transitory computer-readable medium. For example, the exemplary computer device 116 may include computer-executable instructions for receiving order information from a user, transmitting that order information to exchange computer system 100 in electronic messages, extracting the order information from the electronic messages, executing actions relating to the messages, and/or calculating values from characteristics of the extracted order to facilitate matching orders and executing trades. In another example, the exemplary computer device 118 may include computer-executable instructions for receiving market data from exchange computer system 100 and displaying that information to a user.

Of course, numerous additional servers, computers, handheld devices, personal digital assistants, telephones and other devices may also be connected to exchange computer system 100. Moreover, one skilled in the art will appreciate that the topology shown in FIG. 2A is merely an example and that the components shown in FIG. 2A may include other components not shown and be connected by numerous alternative topologies.

As shown in FIG. 2A, the Exchange computer system 100 further includes a message management module 140 which may implement, in conjunction with the market data module 112, the disclosed mechanisms for managing electronic messages containing financial data sent between an exchange and a plurality of market participants, or vice versa. However, as was discussed above, the disclosed mechanisms may be implemented at any logical and/or physical point(s) through which the relevant message traffic, and responses thereto, flows or is otherwise accessible, including one or more gateway devices, modems, the computers or terminals of one or more traders, etc.

Figure 2B:
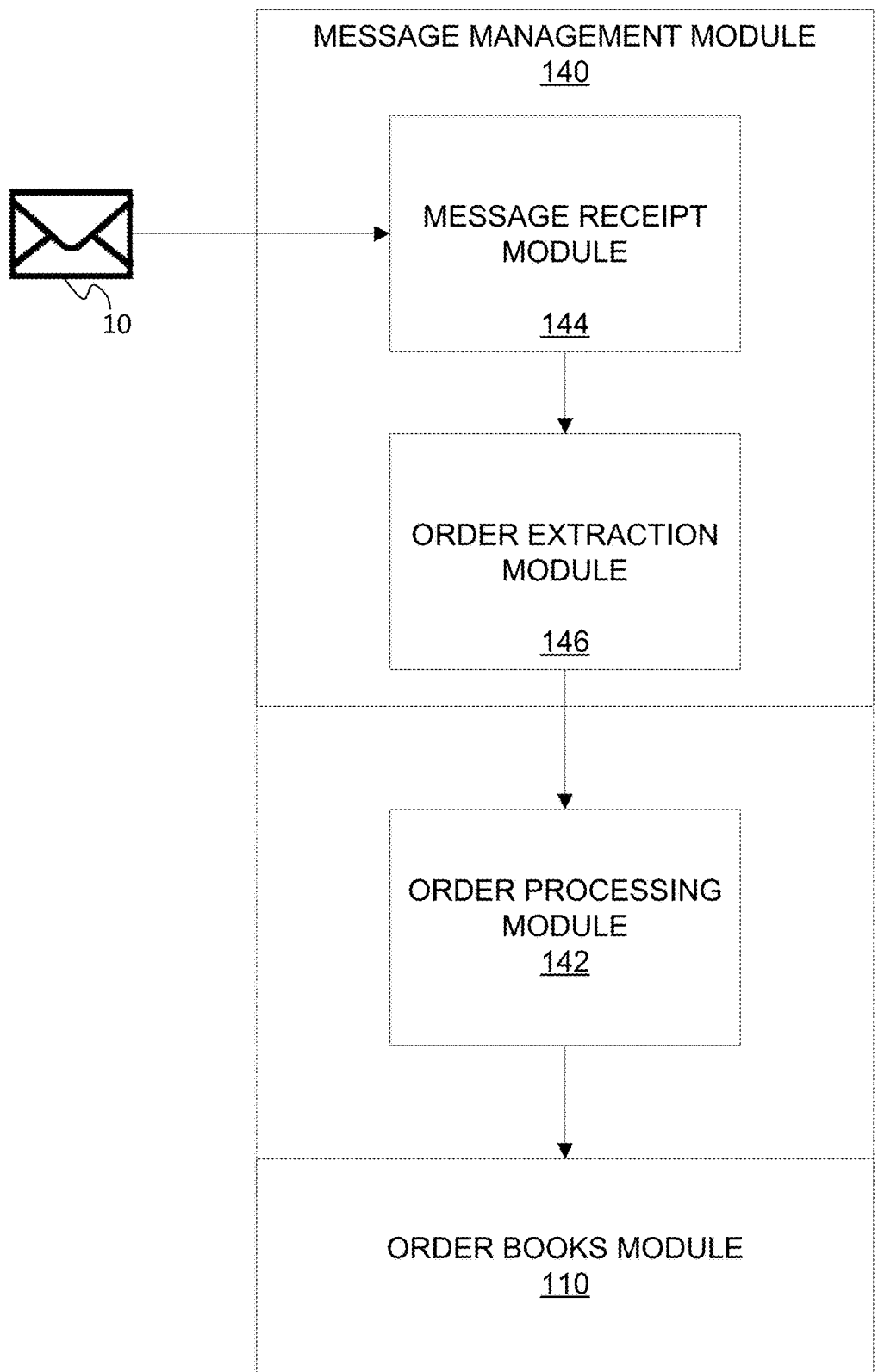
FIG. 2B depicts a block diagram of a message management module and an order books module for use in the system of FIG. 1.

FIG. 2B illustrates an embodiment of market order message management as implemented using the message management module 140 and order books module 110 of the exchange computer system 100. As such, a message 10 may be received from a market participant at the exchange computer system 100 by a message receipt module 144 of the message management module. The message receipt module 144 will process the message 10 by interpreting the content of the message based on the message transmit protocol, such as the transmission control protocol ("TCP"), to provide the content of the message 10 for further processing by the exchange computer system.

Further processing may be performed by the order extraction module 146. The order extraction module 146 may be configured to detect, from the content of the message 10 provided by the message receipt module 144, characteristics of an order for a transaction to be undertaken in an electronic marketplace. For example, the order extraction module 146 may identify and extract order content such as a price, product, volume, and associated market participant for an order. The order extraction module 146 may also identify and extract data indicating an action to be executed by the exchange computer system 100 with respect to the extracted order. The order extraction module may also identify and extract other order information and other actions associated with the extracted order. All extracted order characteristics, other information, and associated actions extracted from a message for an order may be considered an order as described and referenced herein.

The order may be communicated from the order extraction module 146 to an order processing module 142. The order processing module 142 may be configured to interpret the communicated order, and manage the order characteristics, other information, and associated actions as they are processed through an order books module 110 and eventually transacted on an electronic market. For example, the order processing module 142 my store the order characteristics and other content and execute the associated actions. In an embodiment, the order processing module may execute an associated action of placing the order into an order book for an electronic trading system managed by the order books module 110. In an embodiment, placing an order into an order book and/or into an electronic trading system may be considered a primary action for an order. The order processing module 142 may be configured in various arrangements, and may be configured as part of the order books module 110, part of the message management module 140, or as an independent functioning module.

The embodiments described herein utilize trade related electronic messages such as mass quote messages, individual order messages, modification messages, cancellation messages, etc., so as to enact trading activity in an electronic market. The trading entity and/or market participant may have one or multiple trading terminals associated with the session. Furthermore, the financial instruments may be financial derivative products. Derivative products may include futures contracts, options on futures contracts, futures contracts that are functions of or related to other futures contracts, swaps, swaptions, or other financial instruments that have their price related to or derived from an underlying product, security, commodity, equity, index, or interest rate product. In one embodiment, the orders are for options contracts that belong to a common option class. Orders may also be for baskets, quadrants, other combinations of financial instruments, etc. The option contracts may have a plurality of strike prices and/or comprise put and call contracts. A mass quote message may be received at an exchange. As used herein, an exchange 100 includes a place or system that receives and/or executes orders.

It will be appreciated that the disclosed embodiments may be applicable to other types of messages depending upon the implementation. Further, the messages may comprise one or more data packets, datagrams or other collection of data formatted, arranged configured and/or packaged in a particular one or more protocols, e.g. the FIX protocol, TCP/IP, Ethernet, etc., suitable for transmission via a network 214 as was described, such as the message format and/or protocols described in U.S. Pat. No. 7,831,491 and U.S. Patent Publication No. 2005/0096999 A1, both of which are incorporated by reference herein in their entirety. Further, the disclosed message management system may be implemented using an open message standard implementation, such as FIX or FIX/FAST, or by an Exchange-provided API.

Figure 3A:
FIG. 3A depicts a flow chart for managing electronic market messages to facilitate placing orders and executing trades that may be implemented using the system of FIG. 2A.
Figure 4:
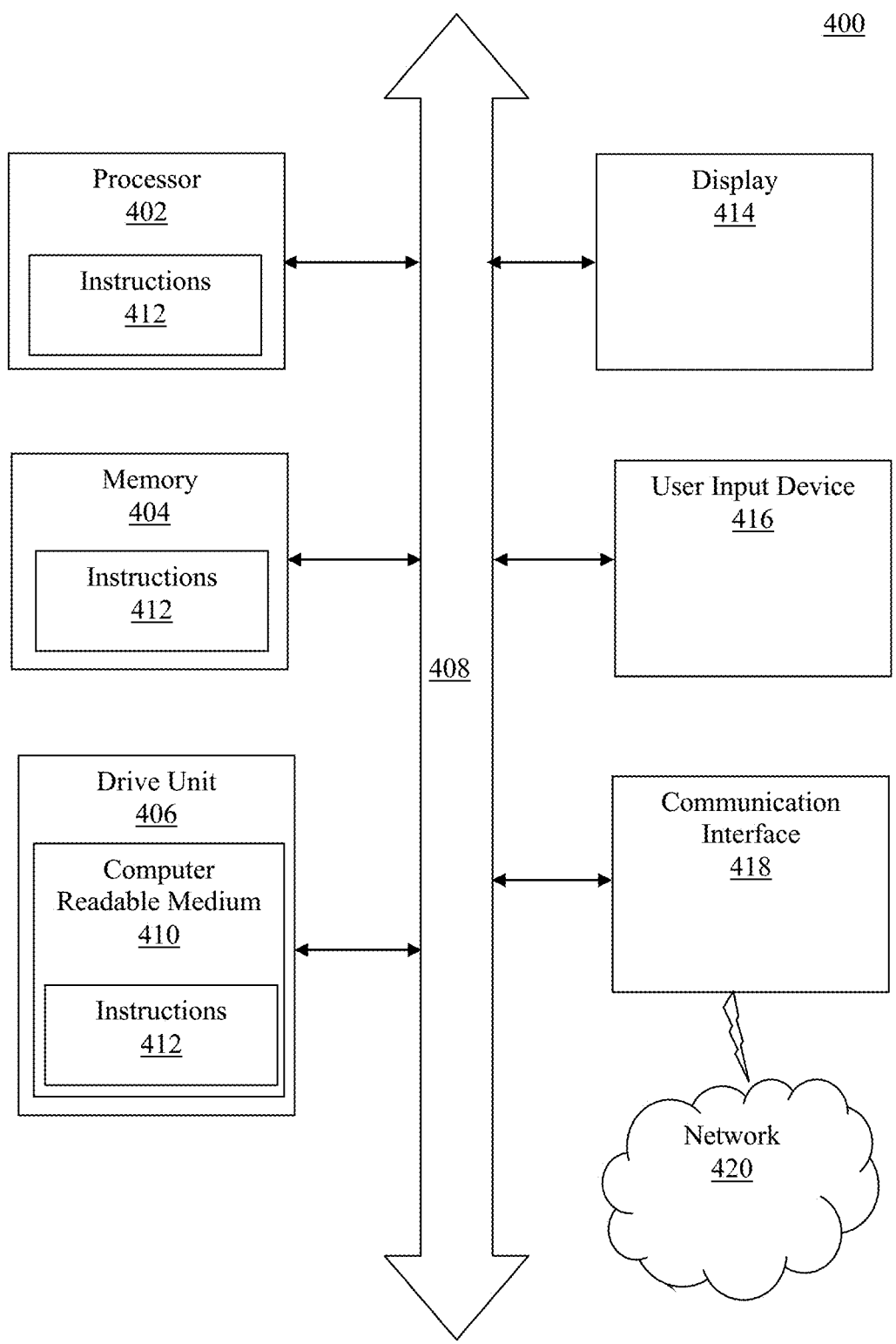
FIG. 4 shows an illustrative embodiment of a general computer system for use with the system of FIG. 2A.

FIG. 3A indicates a flow chart for market electronic order message management, which may be implemented with computer devices and computer networks, such as those described with respect to FIG. 4. Embodiments may involve all, more or fewer actions indicated by the blocks of FIG. 3A. For example, an embodiment may involve receiving (Block 310) and executing (315). Another embodiment may involve receiving (Block 310), detecting (Block 320), and executing (Block 325). Yet another embodiment may involve executing (Block 315), detecting (Block 320), and executing (Block 325). Other actions may also be added.

In an embodiment a plurality of electronic messages is received from the network. The plurality of electronic message packets may be received at a network interface for the electronic trading system (Block 312). The plurality of electronic messages may be sent from market participants. The plurality of messages may include order characteristics and have associated actions to be executed with respect to an order that may be extracted from the order characteristics. The action may involve any action as associated with transacting the order in an electronic trading system. The actions may involve placing the orders within a particular market and/or order book of a market in the electronic trading system.

In an embodiment, the market may operate using characteristics that involve collecting orders over a period of time, such as a batch auction market. In such an embodiment, the period of time may be considered an order accumulation period. The period of time may involve a beginning time and an ending time, with orders placed in the market after the beginning time, and the placed order matched at or after the ending time. As such, the action associated with an order extracted from a message may involve placing the order in the market within the period of time. Also, electronic messages may be received prior to or after the beginning time of the period of time.

The electronic messages may also include other data relating to the order. In an embodiment, the other data may be data indicating a particular time in which the action is to be executed. As such, the order may be considered a temporally specific order. The particular time in which an action is undertaken may be established with respect to any measure of absolute or relative time. In an embodiment, the time in which an action is undertaken may be established with reference to the beginning time of the time period or ending time of the time period in a batch auction embodiment. For example, the particular time may be a specific amount of time, such as 10 milliseconds, prior to the ending time of an order accumulation period in the batch auction. Further, the order accumulation period may involve dissecting the accumulation period into multiple consecutive, overlapping, or otherwise divided, sub-periods of time. For example the sub-periods may involve distinct temporal windows within the order accumulation period. As such, the particular time may be an indicator of a particular temporal window during the accumulation period. For example, the particular time may be specified as the last temporal window prior to the ending time of the accumulation period.

In an embodiment, the electronic message may also include other actions to be taken with respect to the order. These other actions may be actions to be executed after the initial or primary action associated with the order. For example, the actions may involve modifying or canceling an already placed order. Further, in an embodiment, the other data may indicate order modification characteristics. For example, the other data may include a price or volume change in an order. The other actions may involve modifying the already placed order to align with the order modification characteristics, such as changing the price or volume of the already place order.

In an embodiment, other actions may be dependent actions. For example, the execution of the actions may involve a detection of an occurrence of an event. Such triggering events may be described as other data in the electronic message. For example, the triggering event may be a release of an economic statistic from an organization relating to a product being bought or sold in the electronic market, a receipt of pricing information from a correlated electronic market, a detection of a change in market sentiment derived from identification of keywords in social media or public statements of official related to a product being bought or sold in the electronic market, and/or any other event or combination of events which may be detected by an electronic trading system.

In an embodiment, the action, or a primary action, associated with an order may be executed (Block 315). For example, an order extracted from electronic message order characteristics may be placed into a market, or an electronic order book for a market, such that the order may be matched with other order counter thereto.

In an embodiment involving a market operating using batch auction principles, the action, such as placing the order, may be executed subsequent to the beginning time of the order accumulation period, but prior to the ending time of the order accumulation period. Further, as indicated above, a message may also include other information for the order, such as a particular time the action is to be executed. In such an embodiment, the action may be executed at the particular time. For example, in an embodiment involving a batch auction process having sub-periods during an order accumulation period, an order may be placed during a specified sub-period of the order accumulation period.

Also, it may be noted that messages may be received prior or subsequent to the beginning time of an order accumulation period. Orders extracted from messages received prior to the beginning time may have the associated actions, or primary actions such as placing the order, executed at any time subsequent to the beginning time, but prior to the ending time, of the order accumulation period when no particular time for the execution is indicated in the electronic message. In an embodiment, messages received prior to the beginning time but not having a particular time specified will have the associated action executed as soon as possible after the beginning time. Because of this, specifying a time for order action execution may allow a distribution and more definite relative time of order placement so as to allow resources of the electronic trading system to operate more efficiently.

In an embodiment, the execution of temporally specific messages may be controlled by the electronic trading system such that a limited or maximum number may be executed in any particular accumulation period, or sub-period. In an embodiment, the order accumulation time period involves a plurality of sub-periods involving distinct temporal windows, a particular time indicated by a message may be indicative of a particular temporal window of the plurality of temporal windows, and the execution of the at least one temporally specific message is limited to the execution of a specified sub-period maximum number of temporally specific messages during a particular sub-period. The electronic trading system may distribute the ability to submit temporally specific message to selected market participants. For example, only five temporally specific messages may be allowed in any one particular period or sub-period. Further, the ability to submit temporally specific messages within particular periods or sub-periods may be distributed based on any technique. For example, the temporally specific messages for a particular sub-period may be auctioned off or otherwise sold by the electronic trading system to market participants. Also, the electronic trading system may distribute the temporally specific messages to preferred market participants, or as an incentive to participate in a particular market.

In an embodiment, an event occurrence may be detected (Block 320). The event occurrence may be the occurrence of an event that was specified as other information relating to an order extracted from an electronic message. The event may be a triggering event for a modification or cancellation action associated with an order. The event may be detected subsequent to the execution of the first action when an electronic message further comprises the data representative of the event and a secondary action associated with the order. In an embodiment involving a market operating on batch auction principles, the event may be detected subsequent to the execution of a first action, placing an order, but prior to the ending time of an order accumulation period in which the action was executed.

In an embodiment, other actions associated with an order may be executed (Block 325). The other actions may be any action associated with an order. For example, the action may be a conditional action that is executed in response to a detection of an occurrence of an event (Block 320). Further, in a market operating using batch auction principles, the conditional action may be executed after the placement of an order during an order accumulation period, but in response to a detection of an occurrence of an event prior to an ending time of the order accumulation period. In such an embodiment, the conditional action may be executed prior to the ending time of the order accumulation period. For example, the placed order may be canceled, or modified using other provided order characteristics in the message, in response to the detection of the occurrence of the event.

An event may be any event. An event may be a release of an economic statistic or a fluctuation of prices in a correlated market. An event may also be a perceptible change in market sentiment of a correlated market. A change may be perceptible based on a monitoring of orders or social media for keywords in reference to the market in question. For example electronic trading systems may be configured to be triggered for action by a use of keywords during a course of ongoing public statements of officials who may be in a position to impact markets, such as Congressional testimony of the Chairperson of the Federal Reserve System.

The other, secondary, or supplemental action may also be considered a modification of a first action executed with respect to an order. For example, a cancellation may be considered a cancellation of the placement of the order. Further, a secondary action may have other data in the message which indicates a specific time in which the secondary action may be executed. The specific time may be a time relative to a first action, or placement of the order, or relative to an accumulation period in a batch auction market. For example, the specific time for execution of the secondary action may be at a time specified relative and prior to the ending period of the order accumulation period. Further, multiple secondary actions may be provided for a single order. Also, with each secondary action a different triggering event may be provided.

Figure 3B:
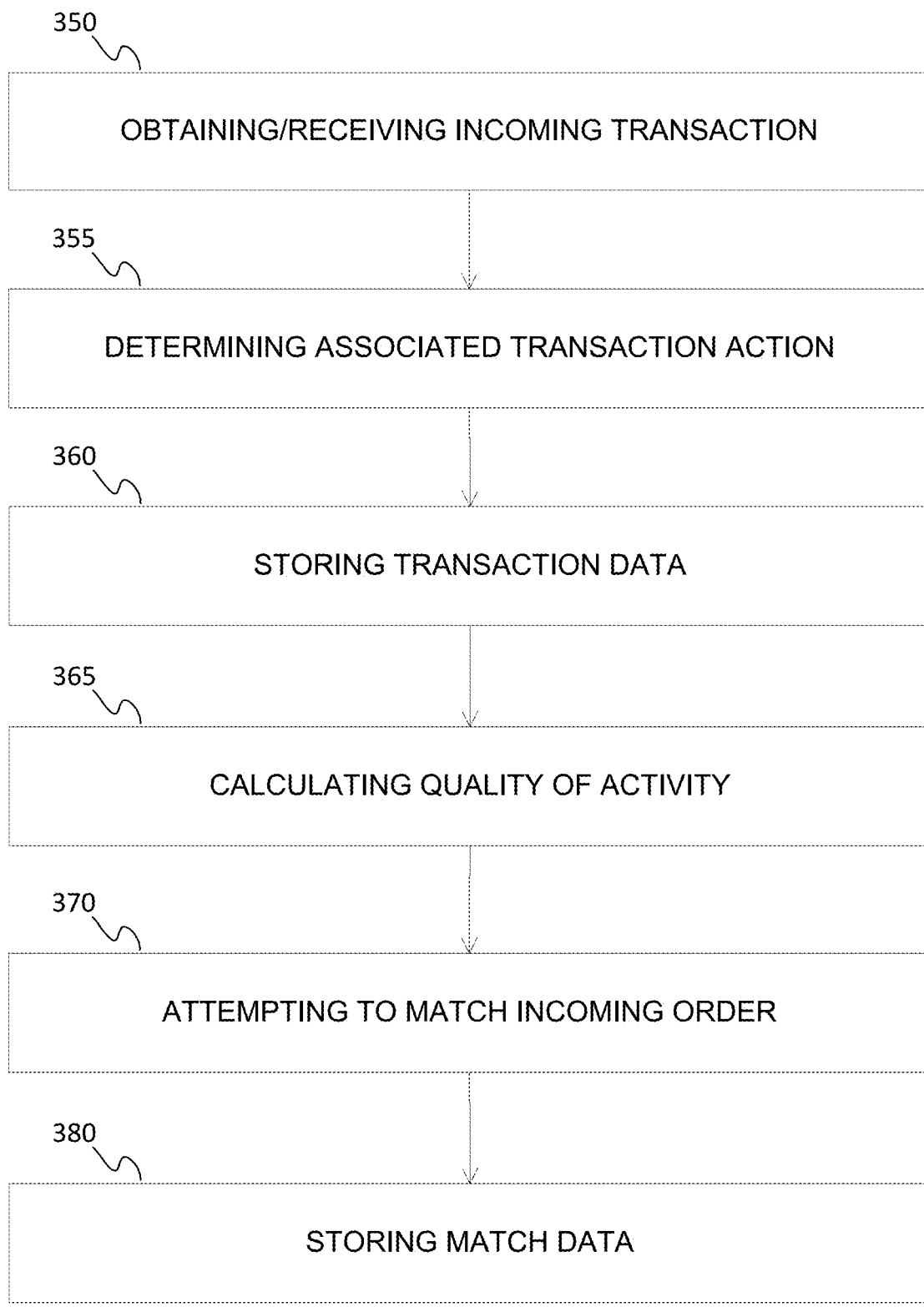
FIG. 3B depicts a flow chart for managing electronic market messages to facilitate executing trades that may be implemented using the system of FIG. 2A.

FIG. 3B is a flowchart indicating a method of managing incoming orders as extracted from messages and placed in an electronic trading system so as to attempt the matching of orders, as may be implemented with computer devices and computer networks, such as those described with respect to FIG. 4. The orders may be considered transactions to buy or sell a financial product, or to modify or cancel an existing order to buy or sell the financial product. Embodiments may involve all, more or fewer actions indicated by the blocks of FIG. 3B. For example, an embodiment may involve receiving (Block 310) and executing (315). Another embodiment may involve receiving (Block 350), storing (Block 360), and calculating (Block 365). Other actions may also be added.

In an embodiment, an incoming transaction may be received (Block 350). The incoming transaction may be from, and therefore associated with, a market participant of an electronic market managed by an electronic trading system. The transaction may involve an order as extracted from a received message, and may have an associated action. The actions may involve placing an order to buy or sell a financial product in the electronic market, or modifying or deleting such an order. In an embodiment, the financial product may be based on an associated financial instrument which the electronic market is established to trade.

In an embodiment, the action associated with the transaction is determined (Block 355). For example, it may be determined whether the incoming transaction comprises an order to buy or sell a quantity of the associated financial instrument or an order to modify or cancel an existing order in the electronic market. Orders to buy or sell and orders to modify or cancel may be acted upon differently by the electronic market. For example, data indicative of different characteristics of the types of orders may be stored.

In an embodiment, data relating to the received transaction is stored (Block 360). The data may be stored in any device, or using any technique, operable to store and provide recovery of data. For example, a memory 404 or computer readable medium 410, may be used to store data, as is described below with respect to FIG. 4. Data may be stored relating received transactions for a period of time, indefinitely, or for a rolling most recent time period such that the stored data is indicative of the market participant's recent activity in the electronic market.

If and/or when a transaction is determined to be an order to modify or cancel a previously placed, or existing, order, data indicative of these actions may be stored. For example, data indicative of a running count of a number or frequency of the receipt of modify or cancel orders from the market participant may be stored. A number may be a total number of modify or cancel orders received from the market participant, or a number of modify or cancel orders received from the market participant over a specified time. A frequency may be a time based frequency, as in a number of cancel or modify orders per unit of time, or a number of cancel or modify orders received from the market participant as a percentage of total transactions received from the participant, which may or may not be limited by a specified length of time.

If and/or when a transaction is determined to be an order to buy or sell a financial product, or financial instrument, other indicative data may be stored. For example, data indicative of quantity and associated price of the order to buy or sell may be stored.

Further, when a transaction is determined to be an order to buy or sell a financial product, or financial instrument, a quality of activity as related to the market participant associated with the order may be calculated (Block 365). The quality may be calculated as a specific value indicative of such quality, or a quality value. A value indicative of a quality of market activity may be considered a value that indicates whether the market activity of the market participant is conducive to improving market liquidity. As such, a quality value may be indicative of previously received transactions from the market participant having increased a probability that the processor will successfully match a subsequently received incoming order to buy or sell the associated financial instrument with at least one other received but unsatisfied order for a transaction counter thereto for the associated financial instrument, to at least partially satisfy one or both of the incoming order or the at least one other received order. Further, the value may be calculated based on the price of the incoming order, previously stored quantities, previously stored data indicative of previously received orders to modify or cancel, and previously stored data indicative of a result of attempts to match previously received orders stored in association with the market participant.

A quality value may be considered a market quality index ("MQI"), indicative of the market participant's quality of market activity. As such, particular categories of market activity may be quantified as a particular score for respective particular categories. Further, the scores of each, or selected, particular categories of market activity may be summed or added together to calculate the quality value or MQI. In an embodiment, the scores for the particular categories may be determined as percentile scores for a market participant in the particular category, as compared with other or all market participants in the electronic market. Further, particular category scores may be determined using data limited to transactions received over a particular length of time, or a most recent number of received transactions. Also, the particular length of time may be a most recent length of time, and as such a rolling window of time indicative of recent market activity of the market participant.

One of the particular categories may be a price proximity category. A proximity category may involve a proximity score indicating a proximity of the received order price to a midpoint of a current price spread of currently unmatched orders. A price spread may be any type of price spread or range or available prices for the product of the electronic market. For example, a price spread may be a difference between a highest price associated with a buy order and a lowest price associated with a sell order. Further, a proximity may be determined using any technique. In an embodiment, a raw difference between the received order price and an average price of the price spread (i.e. bid-ask spread) may be used. For example, a bid-ask spread may be $93.00-$94.00 in a market. As such, the midpoint may be $93.50. An order to buy may then be placed into the market at $92.00, having a corresponding proximity to the midpoint of 1.5. Similarly, an order to buy may be placed in the market at $94.00, which provides a 0.5 proximity to midpoint. Further, the proximity to midpoint may include designations of over/under midpoint values. For example, prices for orders to buy may have a proximity to midpoint defined as the bid-ask spread minus the price, providing values of 1.5 and −0.5 respectively for the examples above. Similarly, offers to sell may have a proximity to midpoint determined as the offer price minus the midpoint, thus providing inverted designations from the offers to buy. Other statistical proximity indicators, such as a standard deviation, or variance, as compared with other open or unmatched orders in the electronic market may also be used.

Another particular category may be an order size category. Larger quantities may be more desirable for liquidity generation than smaller quantities, and as such a market may encourage larger orders by quantifying historical order sizes of market participants in the order size category. The size category may involve a size score indicative of an average quantity of previously received orders from the market participant determined using the previously stored quantities. The average may be determined using any technique, such as a statistical mean or arithmetic average.

Another particular category may be a matched order volume category. A market may consider a number of previously matched orders by a market participant an indicator of a willingness or propensity to trade. As such, the matched order volume may involve a volume score indicative of a number of matched previously received orders from the market participant determined using previously stored data indicative of a result of attempts to match previously received orders stored in association with the market participant.

Yet another particular category may be an order modification category. Market activity characterized by rapid entry and subsequent cancellation or modification of orders that may move an offer to buy to a lower price, or an offer to sell to a higher price, may be considered not conducive to market liquidity. As such, an order modification category may involve a modification score indicative of a frequency of order modifications or cancellations of the market participant determined using the previously stored data indicative of previously received orders to modify or cancel from the market participant. It may be noted that as orders may be modified multiple times, a measure of the number of modifications on a percentage of total orders by a market participant may be above 100%, or generally a larger number than the maximum total number of orders provided to the market by the market participant.

In an embodiment, the particular categories may be weighted by designated weighting factors prior to the summing. In such an embodiment, the calculation of the quality value, or MQI, may be characterized by Equation 1.

$$V=(W_P \times S_P)+(W_S \times S_S)+(W_V \times S_V)+(W_M \times S_M)$$ Equation 1:

In Equation 1, V is the value, $S_P$ is the proximity score, $W_P$ is the weighting factor for the proximity score, $S_S$ is the size score, $W_S$ is the weighting factor for the size score, $S_V$ is the volume score, $W_V$ is the weighting factor for the volume score, $S_M$ is the modification score, $W_M$ is the weighting factor for the modification score. The weighting factors may be provided by any weighting technique. For example, each of the weighting factors may be an allocated value, wherein all the weighting factors added together equals 100% of a total value. In an embodiment, each of the scored values may receive equal weighting, such as 25%. For example, if an order with an associated market participant receives a proximity score of 50, a size score of 70, a volume score of 60 and a modification score of 35, a corresponding calculated MQI may be 53.75 when the weighting factors are equalized at 0.25. Note, that in such an embodiment, total MQI scores will vary between 0 and 100.

As such, with lower category scores indicating better market activity characteristics, 0 may represent the minimum possible, or best possible, score, whereas 100 may represent the maximum, or worst possible, score.

In an embodiment, each score may be determined as a percentile comparative to other market participants. For example, if there are 100 market participants and a particular market participant has a proximity score that ranks that market participant as having the $40^{th}$ best proximity score raw value, such a participant may be considered in the $60^{th}$ percentile, and receive a 60 value as a proximity score. In an alternative embodiment, the same market participant may receive a 40 value as a proximity score. As understood by those with experience in the art, a selection of whether a lower number or a higher number score is favorable may be determinative of how percentile scores are awarded or otherwise calculated.

An electronic market may then attempt to match the incoming order to buy or sell with an appropriate counter order to buy or sell (Block 370). As such, the electronic market may generate and/or execute trades of financial products between market participants. Further, the attempts to match may be enhanced by providing that some orders to buy or sell in the electronic market are given priority in matching over other orders in the electronic market. As such, an identical order to buy or sell, i.e. an identical volume at an identical price, may be differentiated based on assigned priorities such that the order of the identical orders having a higher priority is matched prior to the order having a lower priority. Priorities may be determined using various techniques. In an embodiment, orders may be assigned priority deterministically, that is orders may be assigned priority based on when an order was placed in an electronic market, such that orders placed earlier may have higher priorities. Another technique for determining a priority for an order may be based on the quality value or MQI of an order. For example, orders having a better MQI, i.e. a smaller value, may be filled or otherwise selected for matching over and/or prior to orders having a worse MQI, i.e. a larger value.

In an embodiment involving a market operating using batch auction principles, orders to buy or sell a product of a market may be accumulated over a period of time, such as one ("1") minute. At the end of the accumulation period, attempts to match the accumulated orders are made. A matching process for a batch order market may involve filing accumulated orders at a singular price. For example, accumulated counter orders may be overlaid using a supply curve based on the prices and quantities of accumulated orders. As such, matches may be made using an intersect of the two, i.e. buy and sell, supply and demand curves as a singular price, or also known as an equilibrium price, for matching counter orders. Contrarily, when there is no price intersect of the supply and demand curves, no trades may be executed. Generally, when a price intersect is determined, more orders meeting the matching price criteria on one curve than the other curve, and thus some number of matchable orders may not have corresponding counter orders, and consequentially may not be matched. Priority of orders may be used to determine which matchable orders are actually matched at the end of the order accumulation period in the electronic market. For example, orders having a better MQI score or value may be selected for matching over orders having a worse MQI score.

An MQI score may be used for purposes aside from matching trades. For example, an MQI score may be determined using characteristics specific to a particular market participant, such as an MQI involving just size, volume, and modification scores as indicated above. Such other uses may include any other use for a value indicative of a market participant's propensity for improving market liquidity.

In an embodiment, an MQI value may be used to determine market message throttling in an electronic market. While electronic trading systems may be capable of processing millions, or even billions, of incoming and outgoing messages during a typical trading day, capacity for message management, and ultimately order management, is not unlimited. As a result, an electronic market may adopt a practice of formally or informally limiting, or throttling, the magnitude of message traffic initiated by market participants. This throttling may be applied in light of the informally perceived significance of a market participant's activities for an electronic marketplace. An MQI value may be utilized to guide such throttling decisions such that the allowed magnitude of message traffic becomes a function of a market participant's MQI value.

In an embodiment, an MQI value may be used to establish a fee structure for the participation in a market of market participants. Exchanges may establish a fee structure that preferences certain market participants. As such, a fee structure may be established based on MQI values for market participants, so that better MQI values correlate to lower fees for the associated market participant.

In an embodiment, an MQI may be used to determine a focus for marketing or sales activities of a market exchange administrator. Marketing and/or sales activities are frequently focused on market participants of greater perceived importance. Reference to an MQI of a market participant may be used to determine such marketing or sales activity focus.

Data indicative of attempts to match incoming order may also be saved. The data may be stored in any device, or using any technique, operable to store and provide recovery of data. For example, a memory 404 or computer readable medium 410, may be used to store data, as is described below with respect to FIG. 4.

The acts of the process as described with respect to FIG. 3B may also be repeated. As such, data for multiple received transactions for multiple market participants may be stored and used as describe herein.

Figure 5:
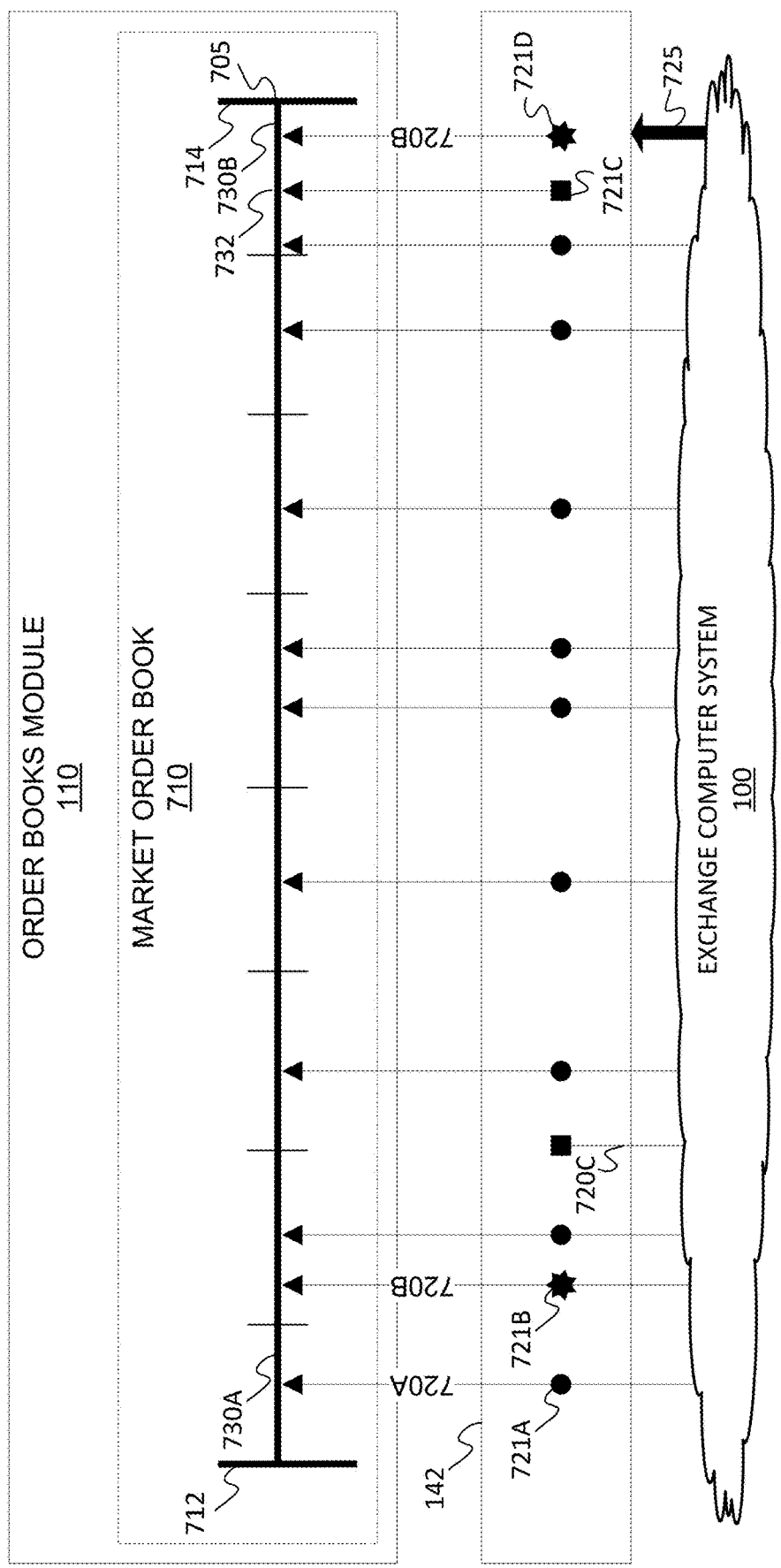
FIG. 5 depicts a diagram for managing the communication of orders with a market order book operating using batch auction techniques.

FIG. 5 illustrates a timeline 705 for order actions 721 undertaken on a particular market order book 710 of an order books module 110. In this embodiment, the market order book 710 is operating under batch auction principles such that there is an order accumulation period between a beginning time 712 and an ending time 714. During this order accumulation period, the exchange computer system 100 may provide orders 720 and associated actions 721 to an order processing module 142. The order processing module 142 may execute the actions associated with the orders 720 according to the principles and/or rules for the execution of actions in the market of the market order book 710. For example, a typical message 720A may involve a placement action 721A which directs the order processing module to execute the placement action 721A at the time when the order 720A is received, such that the order 720 is placed into the market order book 710 for matching at the ending time 714 of the order accumulation period. At the ending time 714 the order accumulation period ends, and entered orders are matched. If no acceptable counter order to a placed order is provided in the market order book 710 at the ending time 714, that particular order may remain unmatched. Unmatched orders may be canceled and deleted from the order book, or transitioned to a subsequent order accumulation period of the market order book 710.

In an embodiment, an order may be a temporally specific order 720C, and the order 720C may include information indicating a specific time 732 when the order is to be placed 721C in the market order book 710. This specific time may be a specific moment in time, or an indicator of a particular sub-period 730B of other sub-periods 730A when the order 720C is to be placed in the market order book 710. Further, the rules of the market for the market order book 710 may limit the number of temporally specific orders 720C that may be placed at specific times 732 or sub-periods 730B.

In an embodiment, a multiple action order 720B may be provided to the order processing module 142. The multiple action order 720B may have associated multiple actions 721B, 721C that may be executed by the order processing module. For example, the multiple action order 720B may be placed 721B in the market order book 710, then a subsequent action 721D, such as an order modification or cancellation may be executed on the order after the placement 721B of the order. Further, the subsequent action 721D may be a conditional action, such that the action is executed in response to the detection of an occurrence of an event 725 by the exchange computer system 100 and/or the order processing module 142.

The order processing module 142 may also store data indicative of characteristics of the extracted orders. For example, the order processing module may store data indicative of orders having an associated modify or cancel action 720B, such as by recording a count of a the number of such orders associated with particular market participants. The order processing module may also store data indicative of quantities and associated prices of orders to buy or sell a product placed in the market order book 710, as associated with particular market participants.

Also, the order processing module 142 may be configured to calculate and associate with particular orders a value indicative of an associated market participant's market activity quality. That is, a value indicative of whether a market participant's market activity increases liquidity of a market. This value may be determined based on the price of the particular order, previously stored quantities of orders from the associated market participant, the previously stored data indicative of previously received orders to modify or cancel as associated with the market participant, and previously stored data indicative of a result of the attempt to match previously received orders stored in association with the market participant. The order processing module 142 may determine or otherwise calculate scores indicative of the quality value based on these stored extracted order characteristics, such as an MQI as described herein.

Also, the matching of orders at the end of the accumulation period 714 may be facilitated using an order priority mechanism. For example, at the end of the accumulation period, attempts to match the accumulated orders are made, such as by a match engine. A matching process for a batch order market may involve filing accumulated orders at a singular price. In such an embodiment, more orders meeting the matching price criteria may exist on one curve than the other curve, and thus some number of matchable orders may not have corresponding counter orders, and consequently may not be matched. Priority of orders may be used to determine which matchable orders are actually matched at the end of the order accumulation period in the electronic market. For example, orders having a better MQI score or value may be selected for matching over orders having a worse MQI score. Data indicative of order matches may be stored by a match engine and/or an order processing module 142, and used for determining MQI scores of market participants.

Referring to FIG. 4, an illustrative embodiment of a general computer system 400 is shown. The computer system 400 can include a set of instructions that can be executed to cause the computer system 400 to perform any one or more of the methods or computer based functions disclosed herein. The computer system 400 may operate as a standalone device or may be connected, e.g., using a network, to other computer systems or peripheral devices. Any of the components discussed above, such as the processor 202, may be a computer system 400 or a component in the computer system 400. The computer system 400 may implement a match engine, margin processing, payment or clearing function on behalf of an exchange, such as the Chicago Mercantile Exchange, of which the disclosed embodiments are a component thereof.

In a networked deployment, the computer system 400 may operate in the capacity of a server or as a client user computer in a client-server user network environment, or as a peer computer system in a peer-to-peer (or distributed) network environment. The computer system 400 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 400 can be implemented using electronic devices that provide voice, video or data communication. Further, while a single computer system 400 is illustrated, the term "system" shall also be taken to include any collection of systems or sub-systems that individually or jointly execute a set, or multiple sets, of instructions to perform one or more computer functions.

As illustrated in FIG. 4, the computer system 400 may include a processor 402, e.g., a central processing unit (CPU), a graphics processing unit (GPU), or both. The processor 402 may be a component in a variety of systems. For example, the processor 402 may be part of a standard personal computer or a workstation. The processor 402 may be one or more general processors, digital signal processors, application specific integrated circuits, field programmable gate arrays, servers, networks, digital circuits, analog circuits, combinations thereof, or other now known or later developed devices for analyzing and processing data. The processor 402 may implement a software program, such as code generated manually (i.e., programmed).

The computer system 400 may include a memory 404 that can communicate via a bus 408. The memory 404 may be a main memory, a static memory, or a dynamic memory. The memory 404 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 404 includes a cache or random access memory for the processor 402. In alternative embodiments, the memory 404 is separate from the processor 402, such as a cache memory of a processor, the system memory, or other memory. The memory 404 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 404 is operable to store instructions executable by the processor 402. The functions, acts or tasks illustrated in the figures or described herein may be performed by the programmed processor 402 executing the instructions 412 stored in the memory 404. The functions, acts or tasks are independent of the particular type of instructions set, storage media, processor or processing strategy and may be performed by software, hardware, integrated circuits, firm-ware, microcode and the like, operating alone or in combination. Likewise, processing strategies may include multiprocessing, multitasking, parallel processing and the like.

As shown, the computer system 400 may further include a display unit 414, such as a liquid crystal display (LCD), an organic light emitting diode (OLED), a flat panel display, a solid state display, a cathode ray tube (CRT), a projector, a printer or other now known or later developed display device for outputting determined information. The display 414 may act as an interface for the user to see the functioning of the processor 402, or specifically as an interface with the software stored in the memory 404 or in the drive unit 406.

Additionally, the computer system 400 may include an input device 416 configured to allow a user to interact with any of the components of system 400. The input device 416 may be a number pad, a keyboard, or a cursor control device, such as a mouse, or a joystick, touch screen display, remote control or any other device operative to interact with the system 400.

In a particular embodiment, as depicted in FIG. 4, the computer system 400 may also include a disk or optical drive unit 406. The disk drive unit 406 may include a computer-readable medium 410 in which one or more sets of instructions 412, e.g. software, can be embedded. Further, the instructions 412 may embody one or more of the methods or logic as described herein. In a particular embodiment, the instructions 412 may reside completely, or at least partially, within the memory 404 and/or within the processor 402 during execution by the computer system 400. The memory 404 and the processor 402 also may include computer-readable media as discussed above.

The present disclosure contemplates a computer-readable medium that includes instructions 412 or receives and executes instructions 412 responsive to a propagated signal, so that a device connected to a network 420 can communicate voice, video, audio, images or any other data over the network 420. Further, the instructions 412 may be transmitted or received over the network 420 via a communication interface 418. The communication interface 418 may be a part of the processor 402 or may be a separate component. The communication interface 418 may be created in software or may be a physical connection in hardware. The communication interface 418 is configured to connect with a network 420, external media, the display 414, or any other components in system 400, or combinations thereof. The connection with the network 420 may be a physical connection, such as a wired Ethernet connection or may be established wirelessly as discussed below. Likewise, the additional connections with other components of the system 400 may be physical connections or may be established wirelessly.

The network 420 may include wired networks, wireless networks, or combinations thereof. The wireless network may be a cellular telephone network, an 802.11, 802.16, 802.20, or WiMax network. Further, the network 420 may be a public network, such as the Internet, a private network, such as an intranet, or combinations thereof, and may utilize a variety of networking protocols now available or later developed including, but not limited to TCP/IP based networking protocols.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

What is claimed is:

1. A computer implemented method of managing incoming order allocation in an electronic trading system, the electronic trading system comprising a processor which implements a match engine and an electronic market for an associated financial instrument by being operative to attempt to match an incoming order to buy or sell the associated financial instrument with at least one other unsatisfied order for a transaction counter thereto, to at least partially satisfy one or both of the incoming order or the at least one other order, the method comprising:

receiving, by the processor, an incoming order to buy or sell the associated financial instrument from a market participant in the electronic market;

calculating, by the processor, a value indicative of previously received transactions from the market participant having increased a probability that the processor will successfully match a subsequently received incoming order to buy or sell the associated financial instrument with at least one other received but unsatisfied order for a transaction counter thereto for the associated financial instrument, to at least partially satisfy one or both of the incoming order or the at least one other received order;

attempting, by the processor, to match the incoming order with at least one other received but unsatisfied order in the electronic market to at least partially satisfy one or both of the incoming order or at least one other received but unsatisfied order, wherein the incoming order is selected for matching over at least one other currently pending but unmatched order having a lower associated calculated value; and storing, by the processor in the memory coupled therewith, data indicative of a result of the attempt to match the incoming order.

2. The method of claim 1, wherein the storing comprises storing data corresponding to transactions received from the market participant over a determined length of time.

3. The method of claim 1, wherein calculating comprises calculating based on at least one of a price of the incoming order, a previously stored quantities, a previously stored data indicative of previously received orders to modify or cancel, or previously stored data indicative of a result of the attempt to match previously received orders stored in association with the market participant.

4. The method of claim 3, wherein calculating further comprises determining a proximity of the price of the incoming order to a midpoint of prices associated with other unmatched orders placed in the electronic market.

5. The method of claim 4, wherein the midpoint is an average of the highest placed and unmatched order to buy and the lowest placed and unmatched order to sell currently in the electronic market.

6. The method of claim 1, wherein calculating comprises determining an average of previously stored quantities of orders associated with the market participant.

7. The method of claim 1, wherein calculating comprises determining a number of matched trades from previously stored data indicative of results of the attempt to match previously received orders stored in association with the market participant.

8. The method of claim 1, wherein calculating comprises determining a number of orders to modify or cancel from previously stored data indicative of previously received orders to modify or cancel.

9. The method of claim 1, wherein calculating comprises determining scores for particular categories of market activity of the market participant and summing the scores to determine the value.

10. The method of claim 9, wherein the scores for the particular categories are determined as a percentile value for the market participant as compared with other market participants in the electronic market.

11. The method of claim 9, wherein the particular categories are weighted by designated weighting factors prior to the summing.

12. A computer system for managing incoming order allocation in an electronic trading system, the electronic trading system comprising a processor which implements a match engine and an electronic market for an associated financial instrument by being operative to attempt to match an incoming order to buy or sell the associated financial instrument with at least one other unsatisfied order for a transaction counter thereto, to at least partially satisfy one or both of the incoming order or the at least one other order, the system comprising:

a memory operable to store data indicative of received transactions of a market participant; and a computer processor, coupled with the memory, the computer processor configured to:

receive an incoming order from a market participant in the electronic market;

store, in the memory, in association with the market participant, data indicative of quantity and associated price thereof;

calculate based on the data indicative of quantity and associated price and data indicative of a result of the attempt to match previously received orders stored in association with the market participant, a value indicative of the previously received transactions from the market participant having increased a probability that the processor will successfully match a subsequently received incoming order with at least one other received but unsatisfied order for a transaction counter thereto for the associated financial instrument, to at least partially satisfy one or both of the incoming order or the at least one other received order;

attempt to match the incoming order with at least one other received but unsatisfied order in the electronic market to at least partially satisfy one or both of the incoming order or at least one other received but unsatisfied order, wherein the incoming order is selected for matching over at least one other currently pending but unmatched order having a lower associated calculated value; and store, in the memory, data indicative of a result of the attempt to match the incoming order.

13. The system of claim 12, wherein the computer processor is further configured to store on the memory data corresponding to transactions received from the market participant over a determined length of time.

14. The system of claim 12, wherein the value is calculated using scores for particular categories of market activity of the market participant and summing the scores to determine the value.

15. The system of claim 14, wherein the scores for the particular categories are determined as a percentile value for the market participant as compared with other market participants in the electronic market.

16. The system of claim 14, wherein the particular categories are weighted by designated weighting factors prior to the summing.

17. The system of claim 16, wherein the scores for the particular categories comprise:

a proximity score indicating a proximity of the received order price to a midpoint of a current price spread of currently unmatched orders;

a size score indicative of an average quantity of previously received orders from the market participant determined using the previously stored quantities;

a volume score indicative of a number of matched previously received orders from the market participant determined using previously stored data indicative of a result of attempts to match previously received orders stored in association with the market participant; and a modification score indicative of a frequency of order modifications or cancellations of the market participant determined using the previously stored data indicative of previously received orders to modify or cancel from the market participant.

18. The system of claim 17, wherein the value is determined using an equation represented as:

$$V=(W_P \times S_P)+(W_S \times S_S)+(W_V \times S_V)+(W_M \times S_M)$$

wherein, V is the value, $S_P$ is the proximity score, $W_P$ is the weighting factor for the proximity score, $S_S$ is the size score, $W_S$ is the weighting factor for the size score, $S_V$ is the volume score, $W_V$ is the weighting factor for the volume score, $S_M$ is the modification score, and $W_M$ is the weighting factor for the modification score.

19. A non-transitory computer readable medium including instructions for managing incoming order allocation in an electronic trading system, the electronic trading system comprising a processor which implements a match engine and an electronic market for an associated financial instrument by being operative to attempt to match an incoming order to buy or sell the associated financial instrument with at least one other unsatisfied order for a transaction counter thereto, to at least partially satisfy one or both of the incoming order or the at least one other order, that when executed by the electronic trading system are operable to:

receive an incoming order from a market participant in the electronic market;

store in association with the market participant, data indicative of quantity and price of the incoming order;

calculate based on the price of the incoming order, previously stored quantities, previously stored data indicative of previously received orders to modify or cancel, and previously stored data indicative of a result of the attempt to match previously received orders stored in association with the market participant, a value indicative of the previously received transactions from the market participant having increased a probability that the processor will successfully match a subsequently received incoming order to buy or sell the associated financial instrument with at least one other received but unsatisfied order for a transaction counter thereto for the associated financial instrument, to at least partially satisfy one or both of the incoming order or the at least one other received order;

attempt to match the incoming order with at least one other received but unsatisfied order in the electronic market to at least partially satisfy one or both of the incoming order or at least one other received but unsatisfied order, wherein the incoming order is selected for matching over at least one other currently pending but unmatched order having a lower associated calculated value; and store data indicative of a result of the attempt to match the incoming order.

20. The medium of claim 19, wherein the value is calculated using scores for particular categories of market activity of the market participant and summing the scores to determine the value.

* * * * *